Jan. 26, 1932. S. W. BATH ET AL 1,842,651
GRINDING MACHINE
Filed Feb. 19, 1930 5 Sheets-Sheet 3

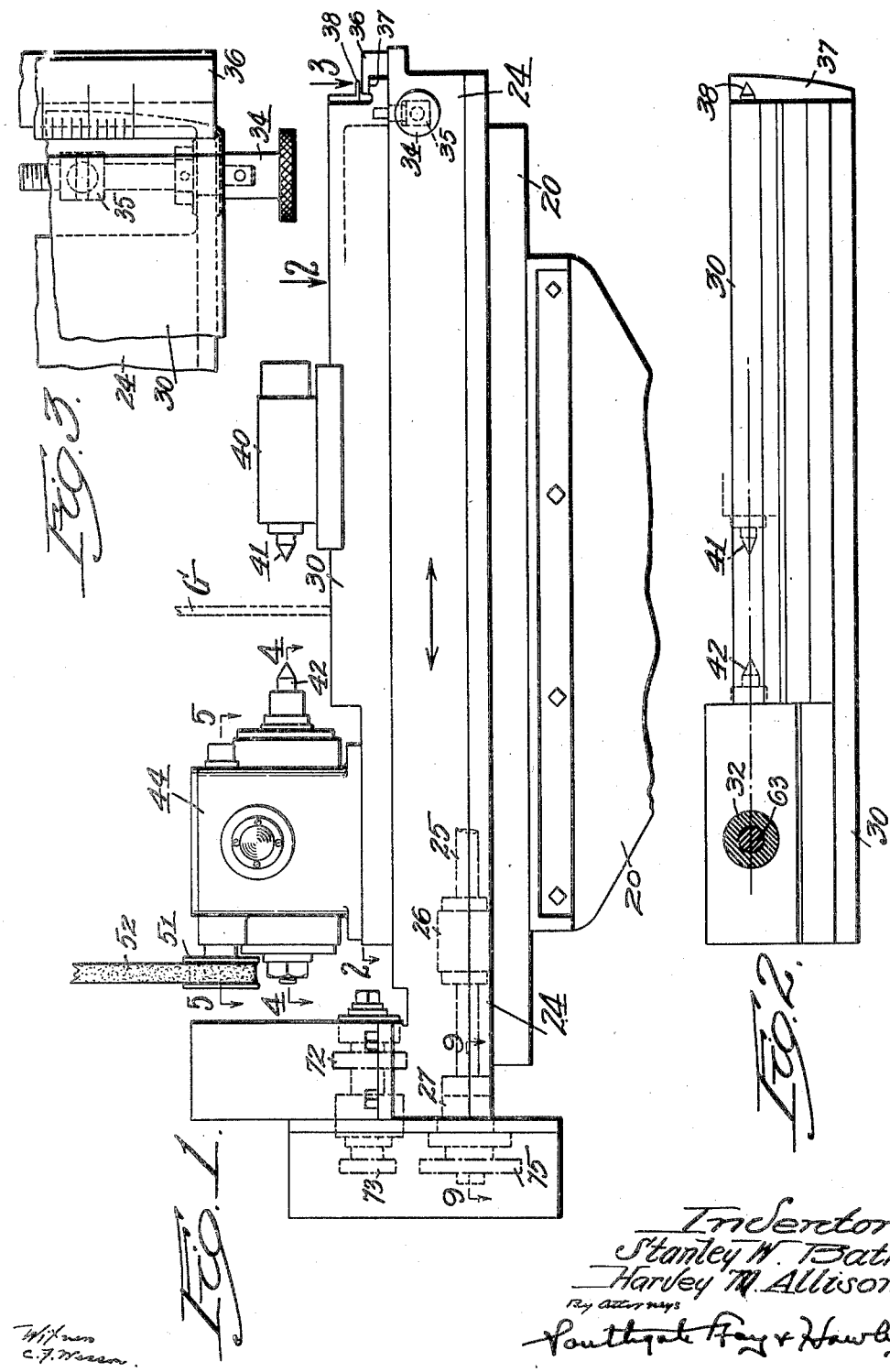

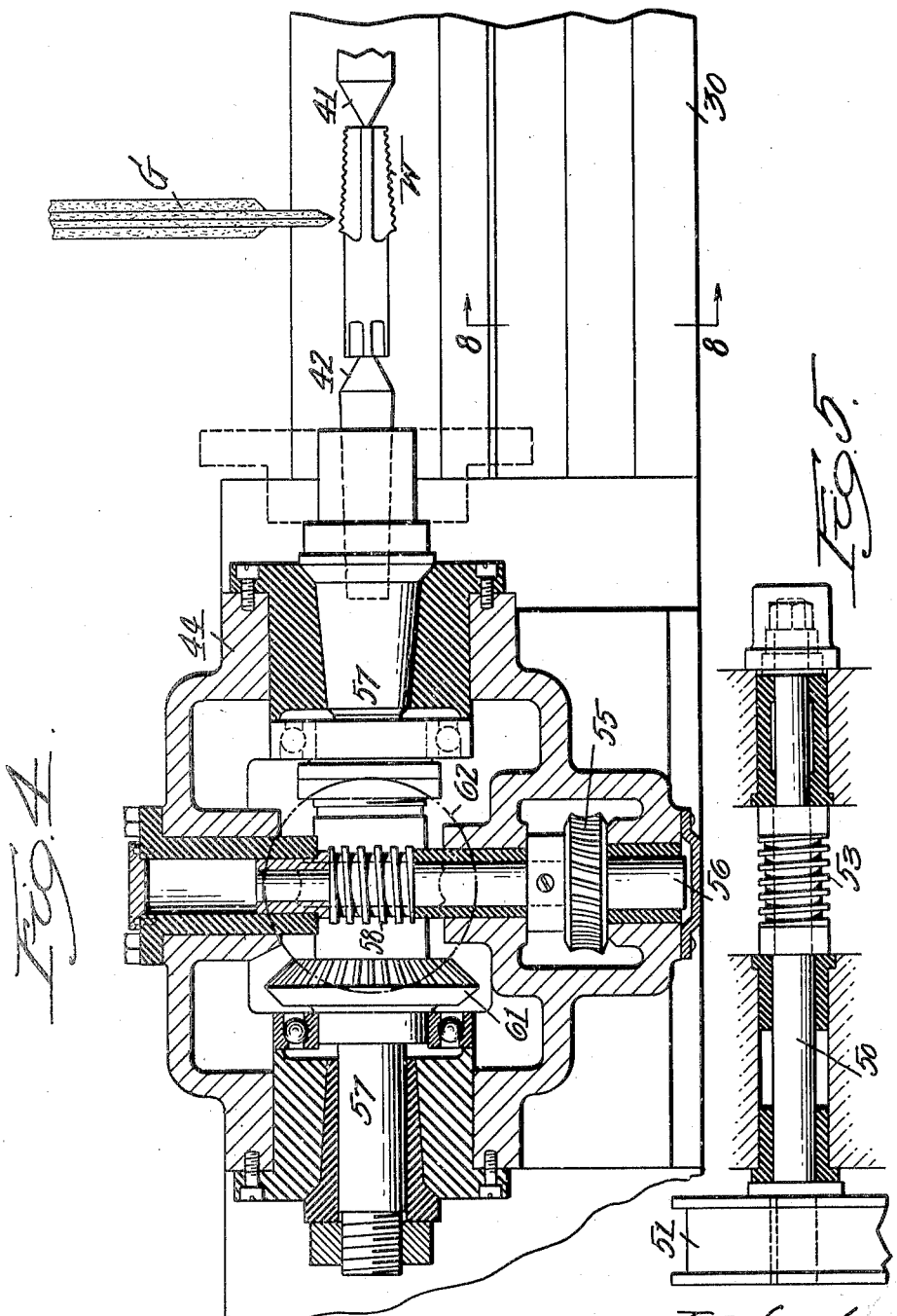

Inventors.
Stanley W. Bath.
Harvey M. Allison.

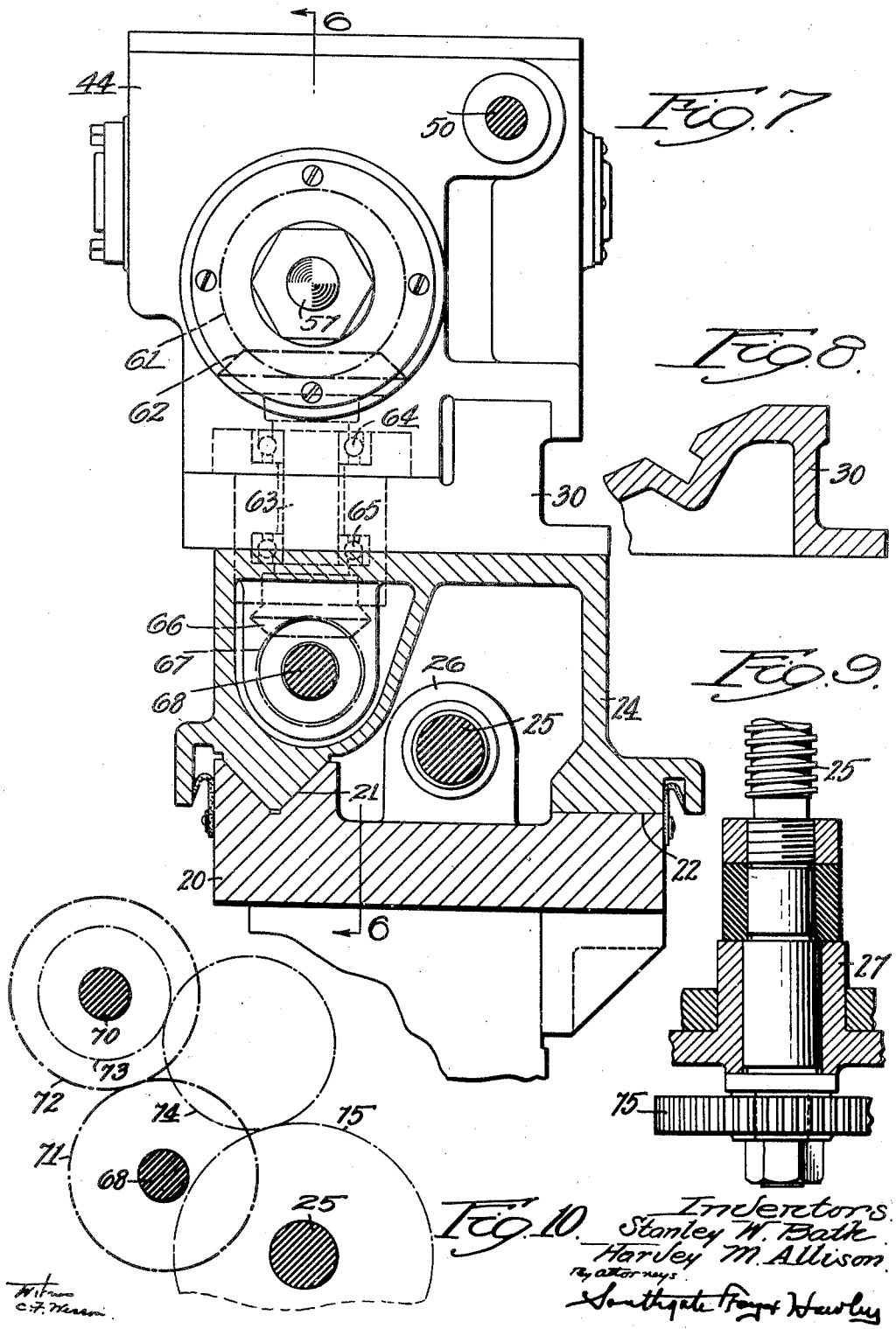

Jan. 26, 1932.                S. W. BATH ET AL                1,842,651
                              GRINDING MACHINE
                          Filed Feb. 19, 1930           5 Sheets-Sheet 5

Inventors.
Stanley W. Bath
Harvey M. Allison

Patented Jan. 26, 1932

1,842,651

UNITED STATES PATENT OFFICE

STANLEY W. BATH AND HARVEY M. ALLISON, OF WORCESTER, MASSACHUSETTS, ASSIGNORS TO JOHN BATH, OF WORCESTER, MASSACHUSETTS

GRINDING MACHINE

Application filed February 19, 1930. Serial No. 429,748.

This invention relates to a grinding machine of general utility but particularly adapted for grinding rotated tapered work, such as pipe taps and other taps having tapered threads.

It is the object of our invention to provide an improved construction in a grinding machine by which the work may be rotated in a predetermined speed relation to the rotation of a lead screw but about an axis of rotation which may be angularly adjusted with reference to the lead screw and to the path of table travel.

Another object is to provide means by which a piece of threaded work may be rotated about an axis and may be reciprocated in a line forming an acute angle with the axis of rotation thereof. An important feature also relates to the provision of a grinding wheel rotated about an axis parallel to the line of reciprocation of the work and trued at unequal angles with respect to its axis of rotation but at equal angles with respect to the axis of rotation of the work.

A further object of our invention is to provide an improved method of grinding threads on a pipe tap or similar tapered work.

Our invention further relates to arrangements and combinations of parts which will be hereinafter described and more particularly pointed out in the appended claims.

A preferred form of the invention is shown in the drawings, in which

Fig. 1 is a front elevation of parts of a grinding machine embodying our improvements;

Fig. 2 is a plan view, partly in section, taken along the line 2—2 in Fig. 1;

Fig. 3 is an enlarged detail plan view, looking in the direction of the arrow 3 in Fig. 1;

Figure 6:
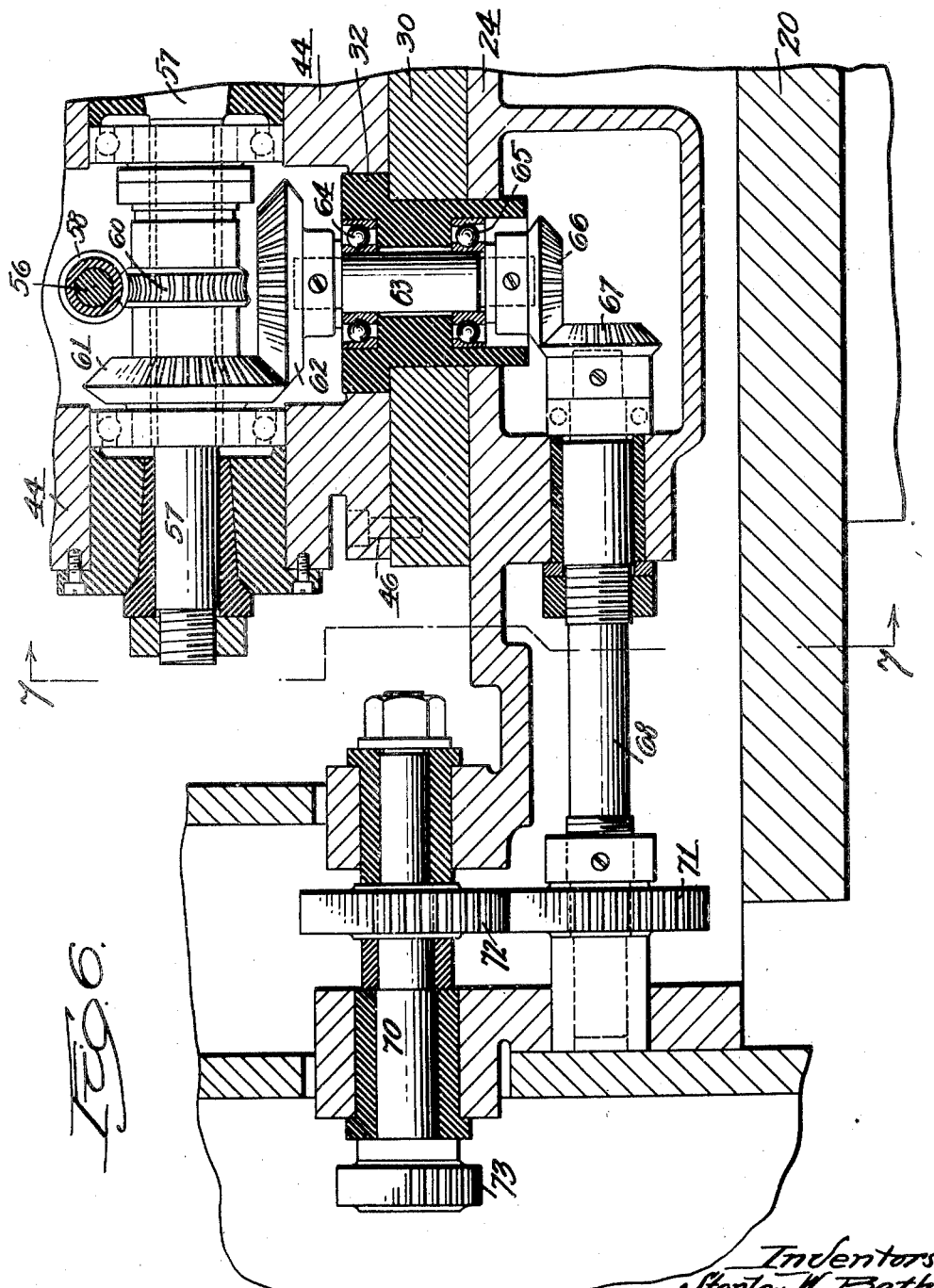
Figure 11:
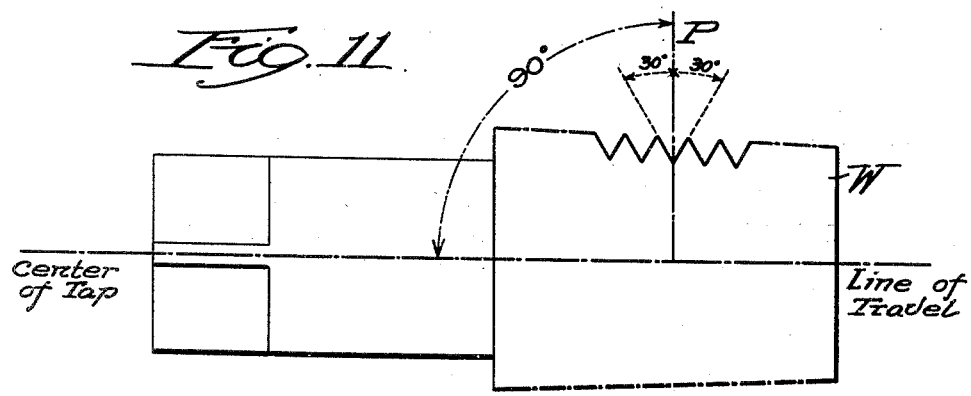
Figure 12:
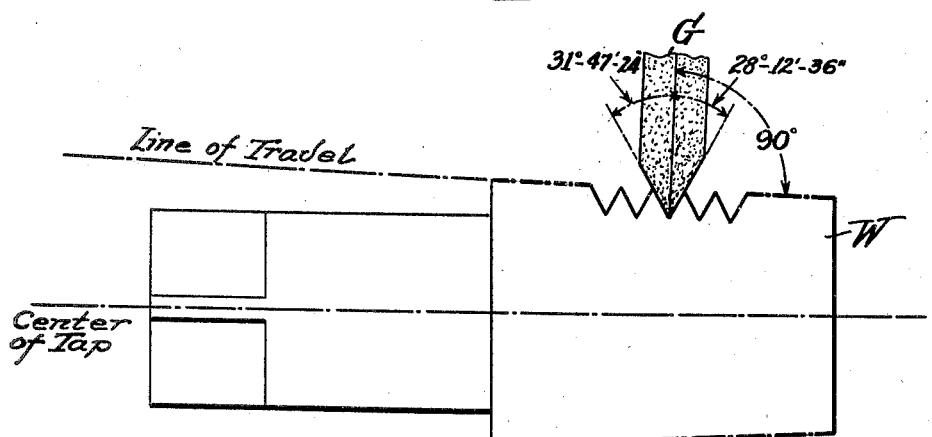
Figure 13:
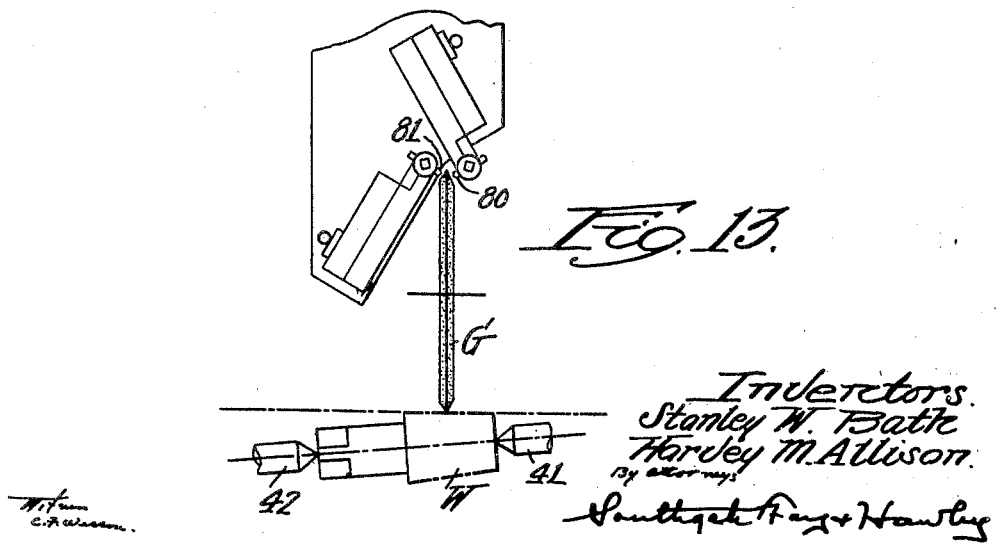

Figs. 4 and 5 are sectional plan views through the driving head, taken along the lines 4—4 and 5—5 in Fig. 1 respectively;

Fig. 6 is a partial sectional front elevation of the work head and driving connections, taken along the line 6—6 in Fig. 7;

Fig. 7 is an end elevation, partly in section, taken along the line 7—7 in Fig. 6;

Fig. 8 is a partial sectional end elevation of the swivel table which supports the tail stock, taken along the line 8—8 in Fig. 4;

Fig. 9 is a detail sectional plan view, taken along the line 9—9 in Fig. 1;

Fig. 10 is a diagrammatic end elevation of a gear train;

Fig. 11 is a plan view of a pipe tap showing the preferred thread section;

Fig. 12 is a view similar to Fig. 11 but showing the details of a grinding wheel adapted to produce the desired thread section; and Fig. 13 is a plan view showing a wheel truing mechanism adapted to produce the desired wheel section.

Referring to the drawings, we have shown parts of a grinding machine comprising a base 20 having a guideway 21 (Fig. 7) and a supporting surface 22 on which a table 24 is slidably mounted. The base 20 is provided with a nut 26 engaged by a lead screw 25 rotatable in bearings 27 supported on the table 24. Rotation of the lead screw 25 alternately in opposite directions causes the reciprocating table 24 to slide back and forth along its guideways in the usual manner.

A swivel table 30 is mounted on the reciprocating table 24 and may be adjusted angularly on the table 24 about the axis of a sleeve or bushing 32 (Fig. 6) extending through the swivel table 30 and into a cylindrical opening in the upper part of the table 24. An adjusting screw 34 (Fig. 3) is mounted at the right hand end of the table 24 and engages a nut 35 mounted beneath the swivel table 30.

A bearing member 36 (Fig. 1) is secured to the upper surface of the table 24 and projects over a bearing surface 37 on an extension of the swivel table 30, thus holding the swivel table firmly seated against the table 24 but at the same time permitting angular adjustment thereof. The upper face of the bearing member 36 may be graduated, as indicated in Fig. 3, and an index member 38 may be mounted on the end of the table 30 to co-operate with said graduations.

A tail stock 40 (Fig. 1) is slidable in guideways extending lengthwise of the swivel table 30 and suitable provision is made for clamping the tail stock in adjusted position thereon. The preferred section of the swivel table is clearly indicated in Fig. 8. The tail stock 40 supports the usual tail center 41 on which the work is rotated. A head or driving center 42 is mounted in the head stock 44 to be described. The axis of the bushing 32 intersects the axis of rotation of the work on the centers 41 and 42.

Head stock and drive

The head stock 44 is mounted on the swivel table 30 and is provided with a cylindrical opening closely fitting the enlarged upper end of the bushing 32 previously described. The head stock is secured in position on the table 30 by a plurality of clamping screws 46 (Fig. 6).

A drive shaft 50 (Fig. 5) is mounted in the upper part of the work head 44 and is provided with a pulley 51 rotated by a belt 52 reversably driven from any suitable source of power. The driving shaft 50 is also provided with a worm 53 engaging a worm wheel 55 on an intermediate shaft 56 (Fig. 4). The shaft 56 is supported in bearings in the head 44 and extends rearward above the work spindle 57 and at right angles thereto. The intermediate shaft 56 is provided with a worm 58 engaging a worm wheel 60 on the work spindle 57 which supports the head or driving center 42 previously described.

The work spindle 57 is connected by bevel gears 61 and 62 (Fig. 6) with an upright shaft 63 rotatable in ball bearings 64 and 65 centered in recesses in the bushing 32 previously described and concentric therewith.

At its lower end the shaft 63 is connected by bevel gears 66 and 67 to a driven shaft 68 rotatably mounted in bearings in the reciprocating table 24. The shaft 68 is connected to an intermediate shaft 70 by spur gears 71 and 72 (Figs. 6 and 10) and the intermediate shaft 70 is provided with a gear 73 (Fig. 6) meshing with an intermediate gear 74 (Fig. 10), which in turn engages a gear 75 on the lead screw 25 (Fig. 9).

We have thus provided positive driving connections between the work spindle 57 and the lead screw 25, which connections will remain operative in all angular positions of the swivel table 30 and work head 44 relative to the reciprocating table 24 and lead screw 25. Such maintenance of positive driving connections is made possible by the fact that the upright shaft 63 is positioned in alignment with the axis of the bushing 32 upon which the table 30 swings in its swivel adjustment.

The gears 73, 74 and 75 constitute change gears by means of which the lead screw 25 may be rotated in any desired speed relation to the rotation of the work spindle. Obviously if the lead screw is adjusted for a given pitch such as ten threads per inch on the work and the swivel table is then adjusted at an angle, a slight correction of change gears will be necessary to produce the correct lead on the angularly positioned work. This adjustment is easily made by changes in the gears 73, 74 and 75 through which the lead screw is driven.

The grinding wheel G is mounted to rotate on a wheel spindle (not shown), the axis of which is maintained at all times parallel to the path of travel of the reciprocating table 24 and to the axis of the lead screw 25. When a piece of tapered work such as a pipe tap W is to be ground, the swivel table 30 is adjusted so that the conical surface on the side adjacent the grinding wheel G will be disposed in a line parallel to the axis of the wheel and to the path of table travel. The grinding wheel then rotates in a plane perpendicular to the conical surface at the point of contact but at an oblique angle to the axis of the work.

The standard form of thread for a pipe tap is indicated in Fig. 11, with the sides of the thread disposed at 30° to a plane P perpendicular to the axis of the tap. In order to produce such a thread with the axis of the work set at an angle to the wheel axis, we counteract the angular adjustment of the work by dressing the edge of the wheel G, as indicated in Fig. 12, increasing the angle at one side of the wheel and decreasing the angle at the opposite side by an amount which exactly offsets the angular position of the work. For a pipe tap of standard taper, one side of the wheel is trued at an angle of 31° 47′ 24″ and the other side is 28° 12′ 36″. These angles are readily maintained by providing a suitable wheel truing device, as indicated in Fig. 13, in which the diamond points 80 and 81 are adjusted to travel at the desired angles.

We are thus able to grind a tap with the standard thread outline indicated in Fig. 11 with a grinding wheel disposed at an oblique angle to the axis of the tap. Theoretically, the angular position of the work would produce a very slight variation in the thread section, even with the wheel trued as indicated in Fig. 12, but in practical operations it is found that such variation is infinitesimal and cannot be detected in the finished work.

One very great advantage of our improved construction lies in the fact that we are able to do away entirely with the use of a taper bar and with all cross travel of the wheel support during the grinding operation. By avoiding these constructions we are able to double the output of the machine, as with our improved construction we are able to change the work at each end of the path of travel and grind in both directions. The back lash and lost motion with our improved construction is a definite and constant amount which can be taken into account when replacing the work, whereas with the old construction the taper bar and cross slide introduced such variable amounts of lost motion that it was impossible to grind in more than one direction.

Having thus described our invention and the advantages thereof, we do not wish to be limited to the details herein disclosed, otherwise than as set forth in the claims, but what we claim is:—

1. In a grinding machine, a base, a table mounted to slide on said base, means to reciprocate said table, a swivel table supported on said reciprocating table, a work rotating head on said swivel table, and positive driving connections between said work head and said table moving means, said driving connections including a transmitting member rotatable about the axis on which said swivel table is angularly adjustable on said reciprocating table.

2. In a grinding machine, a base, a table mounted to slide on said base, means to reciprocate said table, a swivel table supported on said reciprocating table, a work rotating head on said swivel table, and positive driving connections between said work head and said table moving means, said driving connections including a transmitting member rotatable about the axis on which said swivel table is angularly adjustable on said reciprocating table, and said positive driving connection being supported on and movable with said tables.

3. In a grinding machine, a base, a table mounted to slide on said base, means to reciprocate said table, a swivel table supported on said reciprocating table, a work rotating head on said swivel table, and positive driving connections between said work head and said table moving means, said driving connections including a transmitting member rotatable about the axis on which said swivel table is angularly adjustable on said reciprocating table, and said table moving means including a lead screw mounted on said reciprocating table and a nut mounted on said base.

4. In a grinding machine, a base, a table mounted to slide on said base, means to reciprocate said table, a swivel table supported on said reciprocating table, a work rotating head on said swivel table, and positive driving connections between said work head and said table moving means, said driving connections including a transmitting member rotatable about the axis on which said swivel table is angularly adjustable on said reciprocating table, and said axis intersecting the axis of rotation of the work mounted in said head.

5. In a grinding machine, a base, a table mounted to slide on said base, means to reciprocate said table, a swivel table supported on said reciprocating table, a work rotating head on said swivel table, and means to maintain a positive driving connection between said work head and said table reciprocating means in every angular position of said swivel table.

6. In a grinding machine, a base, a table mounted to slide on said base, means to reciprocate said table, a swivel table supported on said reciprocating table, a work rotating head on said swivel table, and positive driving connections between said table moving means and said work head, said driving connections including a transmitting member rotatable about the axis on which said swivel table is angularly adjustable on said reciprocating table, and change gears effective to counteract an error in lead caused by such angular adjustment of said swivel table and rotating work.

7. In a grinding machine, means to rotate the work, means to reciprocate the work in a line forming an acute angle with the axis of rotation of the work, and a grinding wheel mounted to rotate about an axis parallel to the path of reciprocation of the work.

8. The method of grinding tapered threads which comprises supporting and rotating the work, reciprocating the work in a line forming an acute angle with the axis of rotation of the work, providing positive driving connections between said reciprocating means and said work rotating means, rotating a grinding wheel about an axis parallel to the path of reciprocation of the work, and dressing the wheel at equal angles with respect to the axis of rotation of the work, whereby a standard thread outline may be ground in the work while said wheel is disposed at an oblique angle to the axis of the work.

9. In a grinding machine, a base, a table mounted to slide on said base, means to reciprocate said table, a bushing extending through said table, a swivel table supported on said reciprocating table, and angularly adjustable about said bushing, a work rotating head on said swivel table and positive driving connections between said table moving means and said work head, said driving connections including a transmitting member in alignment with the axis of said bushing, and rotatable about said axis, said table moving means including a lead screw mounted on said reciprocating table and a nut mounted on the base and change gears effective to counteract an error in lead caused by an angular adjustment of said swivel table and rotating work.

In testimony whereof we have hereunto affixed our signatures.

STANLEY W. BATH.
HARVEY M. ALLISON.